US011518886B2

(12) United States Patent
Tashiro et al.

(10) Patent No.: US 11,518,886 B2
(45) Date of Patent: Dec. 6, 2022

(54) MODIFIED LIGNIN, MODIFIED POLYPHENOL MANUFACTURING METHOD, AND MODIFIED LIGNIN-INCLUDING RESIN COMPOSITION MATERIAL

(71) Applicant: IDEMITSU KOSAN CO., LTD., Tokyo (JP)

(72) Inventors: Hironori Tashiro, Sodegaura (JP); Yoshihito Koyama, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 16/635,394

(22) PCT Filed: Aug. 10, 2018

(86) PCT No.: PCT/JP2018/030112
§ 371 (c)(1),
(2) Date: Jan. 30, 2020

(87) PCT Pub. No.: WO2019/031609
PCT Pub. Date: Feb. 14, 2019

(65) Prior Publication Data
US 2020/0181410 A1 Jun. 11, 2020

(30) Foreign Application Priority Data
Aug. 10, 2017 (JP) .............................. JP2017-156186

(51) Int. Cl.
C08L 97/00 (2006.01)
C08K 5/13 (2006.01)

(52) U.S. Cl.
CPC .............. *C08L 97/005* (2013.01); *C08K 5/13* (2013.01)

(58) Field of Classification Search
CPC ........... C08L 97/005; C08H 6/00; C08H 8/00; C07G 1/00
See application file for complete search history.

(56) References Cited

U.S. PATENT DOCUMENTS

| | | | |
|---|---|---|---|
| 8,378,020 B1* | 2/2013 | Balakshin ................ | C08H 6/00 524/735 |
| 10,259,903 B2 | 4/2019 | Pietarinen et al. | |
| 2013/0232853 A1* | 9/2013 | Peterson .................. | C07G 1/00 44/307 |
| 2020/0377672 A1* | 12/2020 | Tashiro .................... | C07G 1/00 |

FOREIGN PATENT DOCUMENTS

| | | |
|---|---|---|
| CN | 1275987 A | 12/2000 |
| CN | 101269930 A | 9/2008 |
| CN | 103131022 A | 6/2013 |
| CN | 103554400 A | 2/2014 |
| CN | 106478906 A | 3/2017 |
| JP | H2233701 A | 9/1990 |
| JP | 2008-156601 A | 7/2008 |
| JP | 2009-084320 A | 4/2009 |
| JP | 2012-082255 A | 4/2012 |
| JP | 2013-199561 A | 10/2013 |
| JP | 5671430 B2 | 2/2015 |
| JP | 2016-540058 A | 12/2016 |
| WO | WO-2012/046482 A1 | 4/2012 |
| WO | WO-2015/147165 A1 | 10/2015 |

OTHER PUBLICATIONS

Masamitsu Funaoka, "A New Type of Phenolic Lignin-Based Network Polymer with the Structure-Variable Function Composed of 1,1-Diarylpropane Units," 47 Polymer International 277 (1998).*
Shao-Long Sun et al., "Structural Features and Antioxidant Activities of Degraded Lignins from Steam Exploded Bamboo Stem," 56 Industrial Crops and Products 128 (2014).*
Yongchao Zhang, et al., "Revealing the Structure of Bamboo Lignin Obtained by Formic Acid Delignification at Different Pressure Levels," 108 Industrial Crops and Products 864 (2017).*
English-language translation of JP 2009084320 A, Clarivate Analytics, 7 pages.*
English language machine translation of JP2013-199561, Espacenet on Mar. 29, 2022, 12 pages.*
Extended European Search Report dated Mar. 12, 2021 for corresponding European Patent Application No. 18842933.6.
International Searching Authority, "International Search Report," issued in connection with International Patent Application No. PCT/JP2018/030112, dated Nov. 5, 2018.
International Searching Authority, "Written Opinion," issued in connection with International Patent Application No. PCT/JP2018/030112, dated Nov. 6, 2018.
Chinese Office Action dated Mar. 22, 2022 issued in corresponding Chinese Patent Application No. 201880051532.4.
Japanese Office Action dated Apr. 5, 2022 issued in corresponding Japanese Application No. JP2019535728.
Office Action issued in corresponding Japanese Patent Application No. 2019-535728, dated Oct. 4, 2022.

* cited by examiner

*Primary Examiner* — Nicholas E Hill
(74) *Attorney, Agent, or Firm* — Foley & Lardner LLP

(57) ABSTRACT

A modified lignin having a ratio ((2H+G)/S) of a total of twice of a relative existence ratio H (%) of an H-type skeleton and a relative existence ratio G (%) of a G-type skeleton with respect to a relative existence ratio S (%) of an S-type skeleton, obtained from integrated values measured by $^{31}$P-NMR, of 2.5 or more, and an existence ratio of an aliphatic hydroxy group obtained by the same method of less than 20%, a method for producing a modified polyphenol, and a modified lignin-containing resin composition material.

6 Claims, No Drawings

MODIFIED LIGNIN, MODIFIED POLYPHENOL MANUFACTURING METHOD, AND MODIFIED LIGNIN-INCLUDING RESIN COMPOSITION MATERIAL

CROSS-REFERENCE TO RELATED APPLICATIONS

The present application claims priority under 37 U.S.C. § 371 to International Patent Application No. PCT/JP2018/030112, filed Aug. 10, 2018, which claims priority to and the benefit of Japanese Patent Application No. 2017-156186, filed on Aug. 10, 2017. The contents of these applications are hereby incorporated by reference in their entireties.

TECHNICAL FIELD

The present invention relates to a modified lignin, a method for producing a modified polyphenol, and a resin composition material using the modified lignin.

BACKGROUND ART

Applications of carbon-neutral plant-derived materials to plastic materials have been expected from the standpoint of the greenhouse gas mitigation. The plant-derived materials include cellulose, hemicellulose, lignin, and the like, which are derived mainly from sugars. Among these, lignin is expected to have useful applications as a plastic material due to the aromatic rings, aliphatic hydroxy groups, and aromatic hydroxy groups contained therein. However, lignin is less biodegradable, is substantially not dissolved in a solvent, is poor in handleability due to the high softening point thereof, and is poor in reactivity with the existing plastic materials, and therefore substantially no application of lignin as a plastic material has been found out. Accordingly, for making lignin favorable as a plastic material, techniques for performing suitable purification of lignin, modification thereof, and applications of the modified lignin have been studied.

For example, PTL 1 describes techniques relating to a modified lignin imparted with reactivity through introduction of a benzoxazine skeleton to lignin without decreasing the molecular weight of lignin, and a molding material enhancing the mechanical strength and the like of a molded article with the modified lignin contained therein.

PTL 2 describes a technique of enhancing the reactivity of lignin in such a manner that lignin is phenolated through reaction with a phenol compound in the presence of a catalyst, and then heated with an alkali to form an alkalified lignin, to which an aldehyde compound is further added to form a hydroxymethylated lignin, and a technique of applying the lignin having enhanced in reactivity to a binder composition.

PTL 3 describes a phenol-modified lignin resin and the like improved in resin strength through enhancement of the curability by a production method of reacting lignin with a phenol compound and an aldehyde compound in the presence of an acid.

CITATION LIST

Patent Literatures

PTL 1: Japanese Patent No. 5,671,430
PTL 2: JP 2016-540058 A
PTL 3: WO 2015/147165

SUMMARY OF INVENTION

Technical Problem

According to the related art, the curing reactivity of a material containing lignin can be enhanced to a certain extent. However, in the case where a high quality material capable of replacing a metal member is assumed, the measure of the related art is insufficient in capability of the molded article, for example, the flexural strength. Accordingly, there is a demand of further improving the reactivity of lignin.

Under the circumstances, an object of the present invention is to provide a modified lignin that has an enhanced reactivity with an existing plastic material, a method for producing a modified polyphenol, and a modified lignin-containing resin composition material that is capable of providing a molded article having an enhanced properties, such as an enhanced flexural strength.

As a result of the earnest investigations for solving the problems, the present inventors have found that the problems can be solved by achieving the skeletal ratio conversion of the basic skeleton of lignin, the decrease of the aliphatic hydroxy groups, and the decrease of the molecular weight, in one reaction.

Specifically, the present invention relates to the following.

[1] A modified lignin having a ratio ((2H+G)/S) of a total of twice of a relative existence ratio H (%) of an H-type skeleton and a relative existence ratio G (%) of a G-type skeleton with respect to a relative existence ratio S (%) of an S-type skeleton, obtained from integrated values measured by $^{31}$P-NMR, of 2.5 or more, and an existence ratio of an aliphatic hydroxy group with respect to a total of existence ratios of the aliphatic hydroxy group and an aromatic hydroxy group, obtained from integrated values measured by $^{31}$P-NMR, of less than 20%.

[2] A method for producing a modified polyphenol, including reacting a polyphenol-containing composition with a phenol compound having a hydrogen atom at at least one of the 2-position, the 4-position, and the 6-position as the positions of substituents with respect to the hydroxy group.

[3] A modified lignin-containing resin composition material containing the modified lignin.

Advantageous Effects of Invention

According to the present invention, a modified lignin that has an enhanced reactivity with an existing plastic material, a method for producing a modified polyphenol, and a modified lignin-containing resin composition material that is capable of providing a molded article having an enhanced properties, such as an enhanced flexural strength can be provided.

DESCRIPTION OF EMBODIMENTS

[Modified Lignin]
(Basic Skeleton of Lignin)

Lignin is a polymer compound formed through polymerization of three kinds of lignin monomers, which are p-hydroxy cinnamic alcohol compounds, and has a basic skeleton represented by the following formula (2).

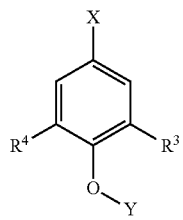

(2)

In the formula (2), $R^3$ and $R^4$ as substituents each represent a hydrogen atom or a methoxy group. The skeleton having both $R^3$ and $R^4$ that are hydrogen atoms is referred to as a p-hydroxyphenyl nucleus (H-type skeleton), the skeleton having any one of $R^3$ and $R^4$ that is a hydrogen atom is referred to as a guaiacyl nucleus (G-type skeleton), and the skeleton having both $R^3$ and $R^4$ that are not a hydrogen atom is referred to as a syringyl nucleus (S-type skeleton).

In the formula (2), X represents a bond to a carbon atom, and Y represents a bond to a hydrogen atom or a carbon atom.

In the basic skeleton of lignin, the carbon atoms bonded to $R^3$ and $R^4$ each are a reactive site having high reactivity (which may be hereinafter referred simply to as a "reactive site"), but the reactivity of the carbon atom becomes poor in the case where $R^3$ or $R^4$ is a methoxy group. Accordingly, for reacting lignin, $R^3$ and $R^4$ are demanded to be hydrogen atoms.

Lignin also contains an aliphatic moiety in addition to the aforementioned aromatic moiety, and a hydroxy group existing in the aliphatic moiety is poor in oxidation stability (tending to change to an aldehyde or a carboxylic acid through oxidation) and therefore the aliphatic hydroxy group is preferably as smaller as possible in amount, for improving the reactivity with an existing plastic material.

Furthermore, by decreasing the molecular weight of lignin without decreasing the softening point largely, the mixing capability thereof can be enhanced, and the reactivity thereof with an existing plastic material can be enhanced.

Consequently, lignin that has a small amount of an aliphatic hydroxy group, has a large amount of the two kinds of skeletons having high reactivity, i.e., the H-type skeleton and the G-type skeleton, and also has a molecular weight decreased without decreasing the softening point largely has high reactivity and is favorable as a plastic material.

However, the existence ratios of the types of basic skeletons and the aliphatic hydroxy group vary depending on the kind of the raw material plant of lignin. Furthermore, natural lignin is intrinsically a macromolecule having a molecular weight that cannot be measured, and thus has a defect that the softening point is largely decreased when the molecular weight thereof is decreased by the existing separation measure.

For example, in a woody biomass, lignin derived from broad-leaf trees contains the G-type skeleton and the S-type skeleton, and lignin derived from coniferous trees contains the G-type skeleton and the S-type skeleton, in which the G-type skeleton exists in a larger amount. Lignin derived from broad-leaf trees and coniferous trees contains substantially no H-type skeleton.

Lignin derived from an herbaceous biomass contains the H-type skeleton, the G-type skeleton, and the S-type skeleton, in which the existence ratio of the H-type skeleton is small.

Lignin derived from coniferous trees contains a large amount of the aliphatic hydroxy group, and the presence of the aliphatic hydroxy group is decreased from lignin derived from broad-leaf trees to herbaceous lignin in this order.

Accordingly, for enhancing the reactivity of lignin, it is necessary to modify lignin in such a method for decreasing the molecular weight that increases the existence ratios of the H-type skeleton and the G-type skeleton, decreases the aliphatic hydroxy group, and does not largely decrease the softening point.

(Modified Lignin)

The modified lignin of the present invention has a ratio ((2H+G)/S) of the total of twice of the relative existence ratio H (%) of the H-type skeleton and the relative existence ratio G (%) of the G-type skeleton with respect to the relative existence ratio S (%) of the S-type skeleton, obtained from integrated values measured by $^{31}$P-NMR, of 2.5 or more, and an existence ratio of the aliphatic hydroxy group with respect to the total of the existence ratios of the aliphatic hydroxy group and the aromatic hydroxy group, obtained similarly from integrated values measured by $^{31}$P-NMR, of less than 20%. The modified lignin of the present invention preferably has a number average molecular weight of less than 1,000 and a softening point of 90° C. or more, through the decrease of molecular weight.

<Ratio ((2H+G)/S) of Existence Ratios of Reactive Site (H-type Skeleton×2+G-type Skeleton) and Non-reactive Site (S-type Skeleton) and Existence Ratio of Aliphatic Hydroxy Group>

In a raw material lignin, $R^3$ and $R^4$ become hydrogen atoms to increase the reactive site of the modified lignin, the aliphatic hydroxy group is decreased, and the molecular weight is decreased without decreasing the softening point largely, through the substitution reaction described later in the production method.

While the H-type has two reactive sites, and the G-type has one reactive site, as described above, the modified lignin of the present invention has a large amount of reactive sites as shown by the ratio ((2H+G)/S) and has good reactivity.

However, although the analysis has revealed that lignin derived from coniferous trees, such as cedar trees, has a ratio ((2H+G)/S) of 3 or more before the modification, the aliphatic hydroxy group exists in 20% or more with respect to the total hydroxy group (i.e., the total of the existence ratios of the aliphatic hydroxy group and the aromatic hydroxy group), and therefore the lignin is not favorable as a plastic material.

Accordingly, in the case where the ratio is less than 2.5, or the case where the existence ratio of the aliphatic hydroxy group is 20% or more, the modified lignin is insufficient in reactivity and cannot be favorable as a plastic material, and cannot be expected to provide a molded article having an enhanced properties, such as an enhanced flexural strength.

On the other hand, the modified lignin of the present invention has a ratio ((2H+G)/S) of 2.5 or more and an existence ratio of the aliphatic hydroxy group with respect to the total of the existence ratios of the aliphatic hydroxy group and the aromatic hydroxy group of less than 20%. The ratio ((2H+G)/S) is preferably 2.8 or more, more preferably 3.0 or more, further preferably 3.5 or more, still further preferably 4.5 or more, still more further preferably 5.5 or more, still more further preferably 7.0 or more, still more further preferably 9.0 or more, still more further preferably 12.0 or more, and still more further preferably 14.0 or more, from the standpoint of the further enhancement of the reactivity of the modified lignin and the achievement of a molded article having an enhanced properties, such as an enhanced flexural strength. The existence ratio of the aliphatic hydroxy group is preferably less than 15%, more preferably less than 12%, further preferably less than 10%, still further preferably less than 6%, and still more further preferably 3% or less, from the same standpoint.

The relative existence ratios of the S-type skeleton, the H-type skeleton, and the G-type skeleton, and the existence ratio of the aliphatic hydroxy group are values that are obtained from integrated values measured by $^{31}$P-NMR, and the details of the $^{31}$P-NMR measurement are described in Magnetic Resonance in Chemistry, vol. 33, pp 375-382 (1995). In the present invention, more specifically, these values can be measured by the methods described in the examples shown later.

<Decrease of Molecular Weight and Softening Point>

The molecular weight of the modified lignin of the present invention is decreased by the modification of the molecular chain of $R^3$ and $R^4$ through the substitution reaction in the production method described later. Accordingly, lignin is enhanced in the mixing capability (i.e., the kneading capability and the agitation capability) with other plastic materials, and is expected to provide a molded article having an enhanced properties, such as an enhanced flexural strength, through the decrease of the molecular weight.

The molecular weight of the raw material lignin is decreased through the occurrence of cleavage of the carbon chain through the substitution reaction, as described above. However, the modified lignin of the present invention necessarily has the phenol compound inserted to the substitution site in the production method described later, and therefore the softening point is not decreased largely even though the molecular weight is decreased. Accordingly, the softening point of the modified lignin of the present invention may be preferably 90° C. or more, more preferably 130° C. or more, and further preferably 160° C. or more. With the softening point of 90° C. or more, a resin composition material containing the modified lignin may be prevented from suffering problems including blister after the molding and post hardening. The softening point of the modified lignin is preferably 200° C. or less, more preferably 190° C. or less, further preferably 180° C. or less, and still further preferably 170° C. or less. With the softening point of 200° C. or less, a resin composition containing the modified lignin can be more readily handled.

The modified lignin of the present invention, for example, preferably has a number average molecular weight of 900 or more and 1,200 or less and a weight average molecular weight of 1,900 or more and 2,700 or less, preferably has a number average molecular weight of 600 or more and less than 900 and a weight average molecular weight of 1,100 or more and less than 1,900, and preferably has a number average molecular weight of 500 or more and less than 600 and a weight average molecular weight of 900 or more and less than 1,100.

The modified lignin of the present invention, for example, generally has a molecular weight distribution (Mw/Mn) of approximately 1.2 to 3.0, preferably 1.3 to 2.8, more preferably 1.4 to 2.5, further preferably 1.5 to 2.0, still further preferably 1.5 to 1.9, and still more further preferably 1.5 to 1.8.

The modified lignin of the present invention, for example, preferably has a softening point of 160° C. or more and 200° C. or less in the case where the number average molecular weight thereof is 900 or more and 1,200 or less, preferably has a softening point of 130° C. or more and 190° C. or less in the case where the number average molecular weight thereof is 600 or more and less than 900, preferably has a softening point of 110° C. or more and 170° C. or less in the case where the number average molecular weight thereof is 500 or more and less than 600, and preferably has a softening point of 90° C. or more and 170° C. or less in the case where the number average molecular weight thereof is 300 or more and less than 500.

The modified lignin of the present invention, for example, preferably has a softening point of 160° C. or more and 200° C. or less in the case where the number average molecular weight thereof is 900 or more and 1,200 or less and the weight average molecular weight thereof is 2,400 or more and 3,000 or less, preferably has a softening point of 130° C. or more and 190° C. or less in the case where the number average molecular weight thereof is 600 or more and less than 900 and the weight average molecular weight thereof is 1,100 or more and less than 2,400, preferably has a softening point of 110° C. or more and 170° C. or less in the case where the number average molecular weight thereof is 500 or more and less than 600 and the weight average molecular weight thereof is 900 or more and less than 1,100, and preferably has a softening point of 90° C. or more and 170° C. or less in the case where the number average molecular weight thereof is 300 or more and less than 500 and the weight average molecular weight thereof is 600 or more and less than 900. These values may be selected depending on the properties of the existing plastic material to be reacted, and thereby the reactivity of the modified lignin can be enhanced through the improvement of the mixing capability, expecting to provide a molded article having an enhanced properties, such as an enhanced flexural strength.

The number average molecular weight and the weight average molecular weight can be measured by the method described in the examples shown later.

[Method for Producing Modified Polyphenol]

The method for producing a modified polyphenol of the present invention includes reacting a polyphenol-containing composition with a phenol compound having a hydrogen atom at at least one of the 2-position, the 4-position, and the 6-position as the positions of substituents with respect to the hydroxy group (which may be hereinafter referred simply to as a "phenol compound").

The method for producing a modified polyphenol of the present invention is a method for producing a modified polyphenol applied to the modification of a polyphenol-containing composition, such as tannin and lignin. In the method for producing a modified polyphenol of the present invention, in particular, the raw material polyphenol contained in the polyphenol-containing composition is preferably lignin from the standpoint of the usefulness as a plastic material. Accordingly, the polyphenol-containing composition is preferably a lignin-containing composition or lignin, and more preferably lignin, and the modified polyphenol is preferably a modified lignin.

In the following description, specific explanation is made for an example, in which the raw material polyphenol contained in the polyphenol-containing composition is lignin (which may be hereinafter referred to as a "raw material lignin"), and the modified polyphenol is a modified lignin, but the method for producing a modified polyphenol of the present invention is not limited to the raw material lignin and the modified lignin.

(Reaction Process)

<Lignin>

The raw material lignin used as a raw material in the method for producing a modified polyphenol of the present invention is derived from a plant biomass including a woody biomass and an herbaceous biomass.

In the method for producing a modified lignin of the present invention, the lignin-containing composition used may be a biomass residue derived from a plant biomass including a woody biomass and an herbaceous biomass, and the like.

Examples of the biomass residue include a black liquor (containing sulfide lignin, kraft lignin, soda lignin, and the like) and tannin, which may be used alone or as a combination of two or more kinds thereof.

Examples of the plant biomass include a woody biomass and an herbaceous biomass. Examples of the woody biomass include coniferous trees and broad-leaf trees, such as cedar trees, Japanese cypress trees, false cypress trees, cherry trees, eucalyptus trees, beech trees, and bamboos.

Examples of the herbaceous biomass include trunks and empty fruit bunches of palm, fibers and seeds of palm fruits, bagasse (pomace remaining after extracting sugarcane and high-biomass sugarcane), cane tops (tops and leaves of sugarcane), energy cane, rice straws, wheat straws, cobs, stovers, and residues of corn (corn stovers, corn cobs, and corn hulls), Sorghum (including sweet sorghum) residues, seed coats and hulls of Jatropha curcas, cashew hulls, switchgrass, Erianthus, high-biomass-yield crops, and energy crops.

Among these, a herbaceous biomass is preferred, empty fruit bunches of palm, wheat straws, cobs, stovers, and residues of corn (corn stovers, corn cobs, and corn hulls), bagasse, cane tops, energy cane, and residues after the extraction of the useful components thereof are more preferred, and cobs, stovers, and residues of corn (corn stovers, corn cobs, and corn hulls), bagasse, cane tops, and energy cane are further preferred from the standpoint of the availability and the adequateness to the production method applied in the present invention. The useful components include hemicellulose, a carbohydrate, a mineral, and water.

Bagasse contains lignin in an amount of approximately 5 to 30% by mass. The lignin in bagasse contains all the H-type nucleus, the G-type nucleus, and the S-type nucleus as the basic skeleton.

The plant biomass may be used after crushing. The plant biomass may be in any form of blocks, chips, powder, and a hydrous material containing water.

Examples of the method of isolating the raw material lignin from the plant biomass include an organosolv method, a pressurized hot water method, a steam blasting method, an ammonia treatment method, an ammonia blasting method, an acid treatment method, an alkali treatment method, an oxidation decomposition method, a thermal decomposition method, and a microwave heating method. Among these, an organosolv method is preferred from the standpoint that the solvent can be readily removed.

Specifically, for example, by using an organic solvent or a solvent containing an organic solvent and water, lignin contained in the plant biomass is eluted to the solvent by treating at a high temperature, and after removing cellulose and the like through filtration of the lignin-containing solution, the solution is concentrated and dried to isolate the raw material lignin.

The number average molecular weight (Mn) of the raw material lignin is generally approximately 500 to 10,000, preferably 1,000 to 5,000, more preferably 1,250 to 3,000, and further preferably 1,250 to 2,500. In the case where the number average molecular weight is in the range, the raw material lignin can be smoothly dissolved in the phenol compound at the reaction temperature.

The weight average molecular weight (Mw) of the raw material lignin is generally approximately 1,000 to 100,000, preferably 2,000 to 10,000, more preferably approximately 2,500 to 4,000, and further preferably 2,500 to 3,500, due to the same reason.

The molecular weight distribution (Mw/Mn) of the raw material lignin is generally approximately 1.5 to 10.0, preferably 2.0 to 5.0, more preferably 2.0 to 3.0, and further preferably 2.0 to 2.5, due to the same reason.

The number average molecular weight, the weight average molecular weight, and the molecular weight distribution can be measured by the method described in the examples shown later.

In the case where the biomass residue is used as the lignin-containing composition (raw material), the pH of the biomass residue in a hydrous state is controlled to an acidic state. A phenol compound is added thereto in an amount that is the same amount or more by weight as the amount of lignin contained in the raw material. The liquid mixture is heated, and water is removed in a hot state (water can be removed by providing a suitable oil-water separating device, such as a Dean-Stark apparatus, since the phenol compound has a high boiling point). After removing water, the liquid mixture is continuously heated for 1 to 2 hours. The heated liquid mixture contains insoluble matters, which are filtered out with 5C filter paper in a hot state. The filtered solid includes unreacted matters and inorganic contaminants. The filtrate is distilled under reduced pressure to remove the unreacted phenol compound. The phenol compound that cannot be completely removed through the distillation may be subjected depending on necessity to a procedure that the phenol compound is dissolved in acetone, and the product is reprecipitated from water as a poor solvent therefor. The solid matter thus isolated is the modified lignin having been modified. In the case where the phenol compound remaining after the distillation may not cause problem in the subsequent reaction, the product may be used without the distillation.

<Phenol Compound>

The phenol compound used in the method for producing a modified polyphenol of the present invention necessarily has a hydrogen atom at at least one of the 2-position, the 4-position, and the 6-position as the positions of substituents with respect to the hydroxy group. This is because the phenol compound having the 2-position, the 4-position, or the 6-position (i.e., the o-position or the p-position) that is a hydrogen atom is particularly suitable as a receiver for the substituent in the substitution reaction, due to the orientation thereof, and the substituents of $R^3$ and $R^4$ in the basic skeleton of the raw material lignin represented by the formula (2) are transferred to the 2-position, the 4-position, or the 6-position of the phenol compound by mixing the raw material lignin and the phenol compound. Both $R^3$ and $R^4$ in the raw material lignin become hydrogen atoms through the substitution reaction, so as to form the modified lignin having an increased amount of the reaction sites.

Accordingly, the S-type skeleton is decreased, but the G-type skeleton and the H-type skeleton are increased in the raw material lignin to improve the reactivity through the substitution reaction. Simultaneously, the molecular weight is decreased by the modification of the molecular chain of the raw material lignin through the substitution reaction, as described above, and thus the mixing capability of the modified lignin is improved.

The phenol compound may be used alone or as a combination of two or more kinds thereof.

The phenol compound is preferably a compound represented by the following formula (1). With the use of the phenol compound, the number of the receiver for the substituent becomes at least three, enabling the favorable progress of the substitution reaction.

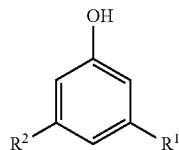

(1)

In the formula (1), $R^1$ and $R^2$ each independently represent a hydrogen atom, a hydroxy group, or an alkyl group having 1 to 15 carbon atoms, and $R^1$ and $R^2$ may be the same as or different from each other.

The alkyl group having 1 to 15 carbon atoms may be linear or branched. A linear or branched alkyl group having 1 to 15 carbon atoms is preferred, a linear or branched alkyl group having 1 to 10 carbon atoms is more preferred, a linear or branched alkyl group having 1 to 5 carbon atoms is further preferred, and a linear alkyl group having 1 to 5 carbon atoms is still further preferred.

Examples of the phenol compound represented by the formula (1) include phenol, resorcinol, phloroglucin; a 3-alkylphenol, such as m-cresol, 3-ethylphenol, and 3-propylphenol; a 5-alkylresorcinol, such as 5-methylresorcinol, 5-ethylresorcinol, and 5-propylresorcinol; and a 3,5-dialkylphenol, such as 3,5-dimethylphenol, 3-methyl-5-ethylphenol, and 3,5-diethylphenol.

At least one of $R^1$ and $R^2$ is preferably a hydroxy group from the standpoint that the phenol compound that has plural hydroxy groups has an increased acidity, from which the progress of the reaction without catalyst can be expected. Examples of the phenol compound of this type include resorcinol, phloroglucin, and a 5-alkylresorcinol (such as 5-methylresorcinol and 5-ethylresorcinol).

<Mass Ratio (Phenol Compound/Raw Material Polyphenol)>

In the production method of the present invention, the mass ratio of the phenol compound with respect to the raw material lignin (which may be the raw material polyphenol, or lignin in the biomass residue in the case where the biomass residue is used) (phenol compound/raw material lignin) is generally approximately 0.1 to 15, and is preferably 0.3 to 15, more preferably 0.5 to 15, further preferably 1 to 15, still further preferably 1 to 13, still more further preferably 1 to 12, still more further preferably 1 to 10, and still more further preferably 1 to 5. In the case where the mass ratio of the phenol compound with respect to the raw material lignin is in the range, the substitution reaction can be performed favorably.

The content of the lignin contained in the biomass residue is measured in such a manner that the raw material as a specimen is crushed with a Wiley mill, and after drying at 105° C., subjected to constituent sugar analysis.

<Acid Catalyst>

In the production method of the present invention, the reaction of the lignin with the phenol compound is preferably performed without catalyst or in the presence of an acid catalyst in an amount of more than 0 to 3.0% by mass, and further 0.2 to 3.0% by mass, based on the total amount of the lignin and the phenol compound.

The reaction can be performed without catalyst depending on the phenol compound used for the reaction as described above. By the reaction performed without catalyst, for example, the subsequent treatment after the reaction process (purification process) can be omitted, and the enhancement of the properties, such as the flexural strength, of a molded article using the resulting modified lignin as a plastic material can be expected.

Examples of the acid catalyst include an inorganic acid, such as phosphoric acid, a phosphate ester, hydrochloric acid, sulfuric acid, and a sulfate ester, and an organic acid, such as acetic acid, formic acid, oxalic acid, and p-toluenesulfonic acid. The acid catalyst may be used alone or as a combination of two or more kinds thereof.

In the case where the acid catalyst is used in the reaction, the amount of the acid catalyst used with respect to the total amount of the raw material lignin and the phenol compound is not particularly limited, as far as the amount is more than 0, and the reaction is generally performed in the presence of the acid catalyst in an amount of 0.01 to 3.0% by mass, preferably 0.1 to 3.0% by mass, more preferably 0.2 to 3.0% by mass, and further preferably 0.4 to 2.6% by mass, from the standpoint of the favorable exhibition of the effect of the acid catalyst added, and the impurities remaining in the modified lignin. With the use of the acid catalyst in an amount within the range, the substitution reaction can be performed favorably.

<Reaction Temperature and Time>

The reaction temperature is generally not particularly limited, as far as the reaction temperature is 100° C. or more, and is generally approximately more than 140° C. and 350° C. or less, preferably more than 140° C. and 300° C. or less, more preferably more than 140° C. and 270° C. or less, further preferably more than 140° C. and 250° C. or less, still further preferably 150 to 230° C., and still more further preferably 150 to 200° C. At a temperature exceeding 140° C., the phenol compound is substantially dissolved to perform the reaction, and at a temperature of 300° C. or less, the reverse reaction can be prevented from proceed.

The reaction time is generally approximately 0.1 to 15 hours, and is preferably 0.5 hour or more, and more preferably 1 hour or more, from the standpoint that the reaction can sufficiently proceed to modify the raw material lignin, and preferably 10 hours or less, and more preferably 2 to 8 hours, from the standpoint that the progress of the reaction cannot be expected from a too long reaction time.

<Solvent>

The reaction of raw material lignin with the phenol compound can be performed without solvent. One or more kind of an organic solvent, for example, an alcohol compound, such as methanol, ethanol, and isopropyl alcohol, a ketone compound, such as acetone and methyl ethyl ketone, an ether compound, such as tetrahydrofuran, and an aromatic compound, and water may be used, and one or more kind of ethanol, acetone, and water is preferably used. The reaction is preferably performed without solvent since a solvent can be prevented from being mixed in the modified lignin, and a step of removing a solvent after the reaction can be omitted.

(Purification Process)

The modified lignin of the present invention is produced by performing the aforementioned reaction process. Accordingly, the modified lignin-containing material obtained through the reaction process can be used directly as a plastic material, and a purification process may be performed after the reaction process.

<Solid-Liquid Separation>

After the reaction, the modified lignin is dissolved in the phenol compound, and the unreacted matters and the inorganic residues are present as solid matters in the liquid. These matters are preferably removed by filtration (in a hot state). For example, the reaction liquid is placed in a hot pressure filtration device having set thereto No. 5C filter paper, No. 2 filter paper, or the like, and filtered under pressure at a temperature of approximately 20 to 150° C., and generally approximately 40 to 90° C., and a pressure of approximately 0.1 to 0.99 MPa, and generally approximately 0.1 to 0.4 MPa. The filtered solid matters may be diluted and/or washed with the phenol compound, and then filtered. In the filtration, the modified lignin is contained in the filtrate. The reaction solution may be diluted and/or washed with one or more kind of a general-purpose low boiling point hydrophilic solvent, for example, a ketone compound, such as acetone and methyl ethyl ketone, an alcohol compound, such as methanol, ethanol, and isopropyl alcohol, and an ether compound, such as tetrahydrofuran, and then subjected to solid-liquid separation. In the solid-liquid separation, the modified lignin is contained in the solution.

The method of performing the solid-liquid separation is not particularly limited, and examples thereof include filtration, filter press, centrifugal separation, and dehydration.

<Distillation>

The distillation may be performed, for example, by subjecting the modified lignin-containing material obtained through the reaction process to distillation under pressure at a temperature of approximately 40 to 200° C., and generally approximately 80 to 150° C., under a reduced pressure of approximately 3 to 20 kPa, and generally approximately 5 to 10 kPa, so as to perform purification by removing the phenol compound after the reaction. In the distillation, the modified lignin is obtained as a solid matter. For example, in the case where a diluting solvent other than the phenol compound is used, the solvent other than the phenol compound may be subjected to distillation under reduced pressure at an appropriate temperature considering the boiling point of the solvent, so as to remove the general-purpose low boiling point hydrophilic solvent, and then the phenol compound may be removed in the same manner as above. In the distillation, the modified lignin is obtained as a solid matter.

<Drying under Reduced Pressure>

The modified lignin obtained through the distillation may be purified by heating generally to 50 to 200° C. and vacuum-drying in a solid state or a molten state, so as to remove the phenol compound after the reaction. The modified lignin in a fluidized state under heating after the distillation may be purified by directly subjecting to the similar vacuum drying, so as to remove the phenol compound after the reaction.

<Reprecipitation>

The modified lignin-containing material obtained through the reaction process may be purified by dissolving in a solvent, such as acetone, and reprecipitating by adding ion exchanged water or the like as the poor solvent for the modified lignin, so as to remove the phenol compound after the reaction.

In the purification, the filtration, the distillation under reduced pressure, the drying under reduced pressure, and the reprecipitation may be combined, and the same process may be performed repeatedly.

The amount of the phenol compound remaining in the modified lignin is not particularly limited, and is generally less than 30%, preferably less than 10%, more preferably less than 5%, and further preferably less than 1%.

(Modification Degree)

By the method for producing a modified polyphenol of the present invention, the modified lignin can be obtained that has an increased amount of the H-type skeleton and the G-type skeleton of the modified lignin as compared to the basic skeleton of the raw material lignin, and simultaneously has an amount of the aliphatic hydroxy group decreased from the raw material lignin, and thus the modified lignin having an increased amount of the reactive sites and a decreased amount of the aliphatic hydroxy group can be obtained.

By the method for producing a modified polyphenol of the present invention, the number average molecular weight and the weight average molecular weight of the modified polyphenol become smaller than the raw material polyphenol in the polyphenol-containing composition. Accordingly, the modified lignin obtained by the production method has a decreased molecular weight and an improved mixing capability.

By the method for producing a modified polyphenol of the present invention, the molecular weight distribution (Mw/Mn) of the modified polyphenol preferably becomes smaller than the raw material polyphenol in the polyphenol-containing composition.

Specifically, by the production method of the present invention, the total of the reactive sites (2H+G) based on the relative existence ratio H (%) of the H-type skeleton and the relative existence ratio G (%) of the G-type skeleton obtained from integrated values measured by $^{31}$P-NMR can be generally increased by 3% or more, and preferably increased by 4% or more, before and after the modification, and the modified lignin having a existence ratio of the aliphatic hydroxy group of less than 20% can also be obtained. Furthermore, while the number average molecular weight and the weight average molecular weight of the modified lignin are decreased from the raw material lignin, the softening point thereof is preferably not decreased to less than 90° C.

[Modified Lignin-containing Resin Composition Material and Molded Article]

The present invention also provides a modified lignin-containing material, particularly a modified lignin-containing resin composition material, containing the modified lignin or a modified lignin produced by the production method, and a molded article using the same. In addition to the modified lignin produced by the production method, a resin component, such as a thermosetting resin and a thermoplastic resin, may be contained. The components other than the modified lignin will be described below.

(Thermosetting Resin)

The modified lignin containing resin composition material may further contain a thermosetting resin.

Examples of the thermosetting resin include general thermosetting resins, such as a phenol resin, an epoxy resin, a polyurethane resin, a melamine resin, a urea resin, an unsaturated polyester resin, a silicone resin, and an alkyd resin. Among these, a phenol resin is preferred since a phenol resin has a phenolic hydroxy group as similar to the modified lignin, can be reacted with the modified lignin, and can be used as a diluent for the modified lignin. In the phenol resin, a novolac phenol resin and a resol phenol resin are preferred. The thermoplastic resin may be used alone or as a combination of two or more kinds thereof.

The content of the thermosetting resin in the modified lignin-containing resin composition material may be determined depending on purposes, and is preferably 100 to 300 parts by mass, and more preferably 150 to 250 parts by mass, per 100 parts by mass of the modified lignin, from the standpoint of the achievement of the good properties and the good moldability.

(Aldehyde Compound)

The modified lignin-containing resin composition material may further contain an aldehyde compound.

The modified lignin-containing resin composition material that contains the modified lignin and an aldehyde compound can be a self-curing molding material.

Examples of the aldehyde compound include formaldehyde, paraformaldehyde, acetaldehyde, propionaldehyde, furfural, benzaldehyde, phenylacetaldehyde, and salicylaldehyde, and among these, formaldehyde is preferred.

The molar ratio of the phenol group and formaldehyde (formaldehyde/phenol group) contained in the modified lignin is preferably 1.0 to 2.5, and more preferably 1.2 to 2.0. In the case where the molar ratio is in the range, the curing rate in reaction can be prevented from being lowered.

An alkali is preferably used from the standpoint of the acceleration of the curing reaction of the modified lignin and the aldehyde compound. Examples of the alkali used include sodium hydroxide, potassium hydroxide, sodium carbonate, potassium carbonate, ammonia, tetramethylammonium hydroxide, and an alkylamine.

The temperature in the curing reaction of the modified lignin and the aldehyde compound and the reaction time therefor are not particularly limited, and are generally approximately 60 to 130° C., and the reaction time is generally approximately 0.5 hour to 5 hours.

The modified lignin-containing resin composition material may further contain one kind or two or more kinds selected from the thermosetting resin and the aldehyde compound in combination.

(Filler)

The modified lignin-containing resin composition material may further contain a filler. The filler may be either an inorganic filler or an organic filler.

Examples of the inorganic filler include spherical or crushed molten silica, silica powder, such as crystalline silica, alumina powder, glass powder, glass fibers, glass flakes, mica, talc, calcium carbonate, alumina, hydrated alumina, boron nitride, aluminum nitride, silicon nitride, silicon carbide, titanium nitride, zinc oxide, tungsten carbide, and magnesium oxide.

Examples of the organic filler include carbon fibers, aramid fibers, paper powder, wood powder, cellulose fibers, cellulose powder, rice hull powder, fruit hulls and nut powder, chitin powder, and starch.

The inorganic filler and the organic filler may be used alone or as a combination of two or more kinds thereof, and the content thereof may be determined depending on purposes. In the case where the inorganic filler and/or the organic filler is contained, the content of the inorganic filler and/or the organic filler is preferably an appropriate amount for providing good properties and good moldability. From this standpoint, the content of the inorganic filler and/or the organic filler is preferably 50 to 200 parts by mass, and more preferably 80 to 150 parts by mass, per 100 parts by mass of the modified lignin.

(Curing Agent)

The modified lignin-containing resin composition material may further contain a curing agent.

Examples of the curing agent include hexamethylenetetramine, hexaformaldehyde, and paraformaldehyde. These compounds may be used alone or as a combination of two or more kinds thereof.

In addition to the curing agent, a catalyst may be used for enhancing the curing rate and the curing degree, for example, an inorganic base, such as calcium hydroxide, sodium hydroxide, potassium hydroxide, calcium oxide, and magnesium oxide, a Lewis acid, such as zinc chloride and zinc acetate, and triethylamine. These compounds may be used alone or as a combination of two or more kinds thereof.

(Other Additives)

The resin composition material according to the present embodiment may further contain various additives added thereto in such a range that does not impair the characteristics of the molded article obtained from the resin composition material. A compatibilizer, a surfactant, and the like may also be added depending on purposes.

Examples of the compatibilizer include a resin obtained by introducing a polar group having maleic anhydride or epoxy to a thermoplastic resin, such as a maleic anhydride-modified polyethylene resin and a maleic anhydride-modified polypropylene resin, and a commercially available compatibilizer, which may be used in combination.

Examples of the surfactant include a linear fatty acid, such as stearic acid, palmitic acid, and oleic acid, and a branched or cyclic fatty acid reacted with a rosin compound, but are not limited thereto.

Examples of the additives that can be mixed in addition to the above include a flexibilizer, a thermal stabilizer, an ultraviolet ray absorbent, a flame retarder, an antistatic agent, an anti-foaming agent, a thixotropy imparting agent, a release agent, an antioxidant, a plasticizer, a stress reducing agent, a coupling agent, a dye, a light scattering agent, and a small amount of a thermoplastic resin. These compounds may be used alone or as a combination of two or more kinds thereof.

(Thermoplastic Resin)

The thermoplastic resin that can be mixed in the modified lignin-containing resin composition material is preferably an amorphous thermoplastic resin having a glass transition temperature of 200° C. or less or a crystalline thermoplastic resin having a melting point of 200° C. or less. Examples of the thermoplastic resin include a polycarbonate resin, a styrene resin, a polystyrene elastomer, a polyethylene resin, a polypropylene resin, a polyacrylic resin (such as a polymethyl methacrylate resin), a polyvinyl chloride resin, a cellulose acetate resin, a polyamide resin, a low melting point polyester resin, represented by a polyester having a combination of terephthalic acid and ethylene glycol, or terephthalic acid and 1,4-butanediol (such as PET and PBT), a polylactic acid and/or a copolymer containing a polylactic acid, an acrylonitrile-butadiene-styrene resin (ABS resin), a polyphenylene oxide resin (PPO), a polyketone resin, a polysulfone resin, a polyphenylene sulfide resin (PPS), a fluorine resin, a silicone resin, a polyimide resin, a polybenzimidazole resin, a polyamide elastomer, and copolymers of those resins and another monomer.

In the case where the modified lignin is used as an additive for a thermoplastic resin, the known methods described, for example, in JP 2014-15579 A and WO 2016/104634 may be used. The content of the thermoplastic resin in the modified lignin resin composition material is preferably 30% by mass or more and 99.9% by mass or less, more preferably 40% by mass or more and 99.9% by mass or less, further preferably 45% by mass or more and 99.9% by mass or less, and particularly preferably 50% by mass or more and 99.9% by mass or less, based on the total amount of the resin composition material, from the standpoint of the achievement of the significant flowability and strength.

The modified lignin-containing resin composition material may contain a resin, an additive, and a filler that are compatible with the thermoplastic resin composition material, in addition to the cellulose-containing solid matter and the thermoplastic resin.

(Kneading and Molding)

The components used in the modified lignin-containing resin composition material may be mixed and kneaded, for example, by a method of preliminarily mixing with a ribbon blender, a drum tumbler, or the like, and then mixing and kneading with a Henschel mixer, a Banbury mixer, a single screw extruder, a twin screw extruder, a multi-screw extruder, a roll kneader, a co-kneader, or the like. The heating temperature in kneading is generally appropriately selected in a range of 100 to 300° C.

The method of molding the modified lignin-containing resin composition material is not particularly limited. Examples thereof include a press molding method, an injection molding method, a transfer molding method, a hollow molding method, and an FRP molding method. In the case where the resin composition material is a thermoplastic resin composition material, examples of the method of molding into a prescribed shape include an extrusion molding method and an injection molding method.

Examples of the molded article using the modified lignin-containing resin composition material include an article obtained by curing a resin composition material containing the modified lignin and a curing agent mixed therein, an article obtained by further mixing various fillers and an industrially produced ordinary phenol resin depending on necessity, molding into a prescribed shape, and then curing, an article obtained by molding after curing, and an article obtained by molding a resin composition material containing the modified lignin and a thermoplastic resin mixed with each other. Examples of the molded article using the modified lignin-containing resin composition material include a heat insulating material for housing, an electronic component, a resin for frac sand, a resin for coated sand, a resin for impregnation, a resin for lamination, a resin for FRP molding, an automobile component, a reinforcing material for an automobile tire, an OA equipment, a machine, an information and communication equipment, an industrial material.

The modified lignin has a potential applicability to modified lignin-containing materials, in addition to the resin composition material. Examples of the modified lignin-containing material other than the modified lignin-containing resin composition material include a carbon material, such as carbon black and carbon fibers, a lubricant, such as a grease base, antioxidative or antibacterial foods or cosmetics, a cement additive, an concrete additive, a binder, a rubber composition, a packaging material, such as a gas-barrier film, an agricultural material, such as a plant activator and a soil improver, an ink or toner, an adhesive, a surfactant, an ultraviolet ray absorbent, an electrode material for a storage battery, a growth promoter for an aquatic life, and a discoloration inhibitor for foods.

EXAMPLES

The present invention will be described more specifically with reference to examples and comparative examples, but the present invention is not limited thereto.

The modified lignin obtained in the examples and the raw material lignin were subjected to various measurements in the following manners.

<Measurement of Molecular Weight>

The modified lignin obtained in the examples and the raw material lignin 1 and 2 were measured for the number average molecular weight (Mn), the weight average molecular weight (Mw), and the molecular weight distribution (Mw/Mn) in terms of standard polystyrene conversion molecular weight with GPC (gel permeation chromatography). The raw material lignin 2 was not completely dissolved in tetrahydrofuran, and therefore only the soluble fraction thereof was measured. The measurement device and conditions were as follows.

Separation column: "TSKgel SuperMultipore HZ-M, produced by Tosoh Corporation×2
Eluent: tetrahydrofuran
Flow amount of eluent: 1.0 mL/min
Detector: differential refractive index (RI)
Measurement temperature: 40° C.

<Relative Existence Ratio of Basic Skeleton (%) and Hydroxy Group Ratio (%)>

(1) A solvent containing deuterated chloroform, pyridine, and cyclohexanol (internal standard) was added to the modified lignin obtained in the examples or the raw material lignin 1 and 2, to which 2-chloro-4,4,5,5-tetramethyl-1,3,2-dioxaphospholane was added as derivatization reagent, and heated to 50° C. for 1 hour. The raw material lignin 2 was not completely dissolved in tetrahydrofuran, and therefore only the soluble fraction thereof was measured. Thereafter, the $^{31}$P-NMR measurement was performed in the following measurement condition.

Pulse width: 30°
Repetition time: 2 seconds
Measurement range: −60 to 200 ppm
Cumulative number: 200

Assuming that the signal derived from cyclohexanol as the internal standard was 145.2 ppm, a range of 144.0 to 142.0 ppm was identified as the S-type skeleton, a range of 141.0 to 136.6 ppm was identified as the G-type skeleton, and the relative existence ratios (%) of the basic skeletons were calculated from the integrated values. The relative existence ratio of the H-type skeleton was calculated by subtracting the relative existence ratios of the S-type skeleton and the G-type skeleton from the total aromatic hydroxy group amount.

Furthermore, a range of 150.0 to 145.5 ppm was identified as the aliphatic hydroxy group, a range of 144.7 to 136.6 ppm was identified as the aromatic hydroxy group, the aliphatic hydroxy group amount (mol/g) and the aromatic hydroxy group amount (mol/g) were calculated from the integral curve, and the hydroxy group ratios (%) thereof were obtained.

(2) Ratio of Existence Ratios and Reactive Site

The followings were calculated based on the relative existence ratios (%) of the basic skeletons.

Ratio ((2H+G)/S) of the total of twice of the relative existence ratio H (%) of the H-type skeleton and the relative existence ratio G (%) of the G-type skeleton with respect to the relative existence ratio S (%) of the S-type skeleton Total of reactive sites (2H+G) based on the relative existence ratio H (%) of the H-type skeleton and the relative existence ratio G (%) of the G-type skeleton Increment rate (%) of (2H+G) before and after the modification <Softening Point (° C.)>

The modified lignin obtained in the examples or the raw material lignin 1 or 2 (solid specimen) was crushed with a mortar, from which large particles were removed with a sieve (40 mesh), and 10 to 20 mg of the crushed specimen was placed in an aluminum cup (diameter of circular upper part: 60 mm, diameter of lower part: 53 mm, depth: 15 mm). The aluminum cup having the specimen placed therein was placed on a hot plate (Asone ND-2A), and closed with a glass plate (thickness: 0.5 mm). After heating to 80° C., the temperature was increased by 10° C., and the temperature at which the specimen was melted was confirmed by visual observation through the glass plate and designated as the softening point.

<Raw Material Lignin 1>

500 g of bagasse (dried pomace of sugarcane) was heat-treated at 200° C. for 4 hours in the presence of 2.1 L of 1-butanol and 3.3 L of water, and the 1-butanol layer was collected. The collected 1-butanol layer was filtered (whatman No. 2 filter paper) to remove the cellulose-containing solid matter. The filtrate was concentrated to dryness to provide 90 g of the raw material lignin 1.

<Modified Lignin>

Example 1

(1) Reaction Process 100 parts by mass of the raw material lignin 1 (100.0 g), 100 parts by mass of phenol, and 1 part by mass of phosphoric acid were placed in a 1.0 L pressure tight vessel capable of performing agitation, and heated, and the agitation was started at the time when phenol was melted. The heating was continuously performed, and the content was heated to 200° C. for 4 hours.

(2) Purification Process

Removal of Phenol through Distillation

The reaction liquid was taken out from the pressure tight vessel, and the reaction liquid was distilled by heating (100 to 130° C.) under reduced pressure (5 to 10 kPa) with a Kugelrohr to remove phenol. Phenol after the reaction was not completely removed with the Kugelrohr, and remained in an amount of approximately 10% by mass with respect to the modified lignin.

Reprecipitation of Modified Lignin 2 parts by mass of acetone was added to 1 part by mass of the modified lignin, from which phenol had been removed through distillation, (5.0 g), so as to dissolve completely. 40 parts by mass of ion exchanged water was added thereto to precipitate the modified lignin. The precipitated modified lignin was recovered through centrifugal separation. The operation was repeated 3 or 4 times, so as to remove completely phenol after the reaction, and thus the modified lignin 1 (4.5 g) was obtained.

Example 2

The same procedure as in Example 1 was performed except that the acid catalyst was not used, so as to provide a modified lignin 2 (4.5 g).

Example 3

The same procedure as in Example 1 was performed except that 19 parts by mass of the raw material lignin 1 and 181 parts by mass of phenol were used, so as to provide a modified lignin 3 (4.4 g).

Example 4

The same procedure as in Example 3 was performed except that the reaction time was 8 hours, so as to provide a modified lignin 4 (4.5 g).

Example 5

The same procedure as in Example 3 was performed except that the reaction temperature was 220° C., so as to provide a modified lignin 5 (4.5 g).

Example 6

The same procedure as in Example 3 was performed except that the amount of the catalyst was 5 parts by mass, so as to provide a modified lignin 6 (4.4 g).

Example 7

The same procedure as in Example 3 was performed except that m-cresol was used instead of phenol, so as to provide a modified lignin 7 (4.5 g).

Example 8

The same procedure as in Example 1 was performed except that 61 parts by mass of the raw material lignin 1 and 139 parts by mass of phenol were used, so as to provide a modified lignin 8 (4.6 g).

Example 9

The same procedure as in Example 8 was performed except that the acid catalyst was not used, so as to provide a modified lignin 9 (4.5 g).

Example 10

The same procedure as in Example 1 was performed except that the reaction temperature was 150° C., and the reaction time was 1 hour, so as to provide a modified lignin 10 (4.4 g).

Example 11

The same procedure as in Example 10 was performed except that the acid catalyst was sulfuric acid, so as to provide a modified lignin 11 (4.6 g).

Example 12

The same procedure as in Example 3 was performed except that the acid catalyst was 0.2 part by mass of sulfuric acid, so as to provide a modified lignin 12 (4.5 g).

The properties of the modified lignin 1 to 12 obtained in Examples 1 to 12 and the raw material lignin 1 are shown in Table 1.

TABLE 1

|  |  | Raw material lignin 1 | Example | | | | | |
|---|---|---|---|---|---|---|---|---|
|  |  |  | 1 | 2 | 3 | 4 | 5 | 6 |
| Molecular weight | Number average (Mn) | 1271 | 1021 | 1199 | 740 | 694 | 693 | 681 |
|  | Weight average (Mw) | 2676 | 2207 | 2670 | 1331 | 1204 | 1165 | 1176 |
|  | Distribution (Mw/Mn) | 2.11 | 2.16 | 2.23 | 1.80 | 1.73 | 1.68 | 1.73 |

TABLE 1-continued

| | | | | | | | | |
|---|---|---|---|---|---|---|---|---|
| Relative existence ratio (%) | H-type skeleton | 5.2 | 5.7 | 5.6 | 3.1 | 2.7 | 2.9 | 3.3 |
| | G-type skeleton | 64.0 | 70.2 | 66.6 | 76.7 | 77.8 | 79.3 | 77.0 |
| | S-type skeleton | 30.8 | 24.1 | 27.8 | 20.2 | 19.5 | 17.8 | 19.6 |
| Ratio of existence ratio and reactive site | ((2H + G)/S) | 2.4 | 3.4 | 2.8 | 4.1 | 4.3 | 4.8 | 4.3 |
| | (2H + G) | 74.4 | 81.5 | 77.8 | 82.9 | 83.2 | 85.1 | 83.7 |
| | Increment ratio before and after modification (%) | — | 9.7 | 4.6 | 11.5 | 11.8 | 14.4 | 12.6 |
| Hydroxy group ratio (%) | Aliphatic | 19.1 | 5.6 | 9.6 | 4.1 | 3.0 | 1.2 | 3.9 |
| | Aromatic | 80.9 | 94.4 | 90.4 | 95.9 | 97.0 | 98.8 | 96.1 |
| Softening point (° C.) | | 170 | 170 | 170 | 140 | 130 | 150 | 130 |
| No. of modified lignin | | — | 1 | 2 | 3 | 4 | 5 | 6 |

| | | Example | | | | | |
|---|---|---|---|---|---|---|---|
| | | 7 | 8 | 9 | 10 | 11 | 12 |
| Molecular weight | Number average (Mn) | 721 | 876 | 1052 | 973 | 676 | 686 |
| | Weight average (Mw) | 1304 | 1693 | 2146 | 1911 | 1189 | 1249 |
| | Distribution (Mw/Mn) | 1.81 | 1.93 | 2.04 | 1.96 | 1.76 | 1.82 |
| Relative existence ratio (%) | H-type skeleton | 3.1 | 3.5 | 4.5 | 3.0 | 1.7 | 2.9 |
| | G-type skeleton | 77.5 | 75.5 | 69.7 | 75.4 | 85.0 | 77.7 |
| | S-type skeleton | 19.4 | 21.0 | 25.8 | 21.6 | 13.3 | 19.4 |
| Ratio of existence ratio and reactive site | ((2H + G)/S) | 4.3 | 3.9 | 3.0 | 3.8 | 6.6 | 4.3 |
| | (2H + G) | 83.7 | 82.4 | 78.7 | 81.4 | 88.3 | 83.4 |
| | Increment ratio before and after modification (%) | 12.6 | 10.9 | 5.8 | 9.5 | 18.8 | 12.2 |
| Hydroxy group ratio (%) | Aliphatic | 3.0 | 5.5 | 9.8 | 5.9 | 2.0 | 4.1 |
| | Aromatic | 97.0 | 94.5 | 90.2 | 94.1 | 98.0 | 95.9 |
| Softening point (° C.) | | 130 | 150 | 160 | 160 | 150 | 140 |
| No. of modified lignin | | 7 | 8 | 9 | 10 | 11 | 12 |

<Cured Product>

In the following examples and comparative examples, resin composition materials and molded articles using the same were produced by using the modified lignin obtained in Examples 1 to 12 and the raw material lignin 1.

The resin composition materials and the molded articles were evaluated in the following manners.

(Kneading Capability)

In Examples 13 to 24 and Comparative Example 1, the kneading capability was evaluated based on the following index.

A: readily kneadable

B: kneadable with difficulty

C: not kneadable (Agitation Capability)

In Examples 25 to 36 and Comparative Example 2, the agitation capability in reaction was evaluated based on the following index.

A: readily agitatable

B: agitatable with difficulty

C: not agitatable (Flexural Strength)

A specimen of 5 mm×50 mm×1 mm was cut out from each of the molded articles obtained in the examples and comparative examples, was measured for the flexural strength with Instron 5566, produced by Instron Japan Co., Ltd., under conditions of a three-point flexural mode, a span of 30 mm, and a speed of 2 mm/min, and was evaluated by the index.

A: specimen difficulty broken

B: specimen broken

C: specimen immediately broken

-: molding failure

Examples 13 to 24

100 parts by mass of a novolac phenol resin (PR-53195, produced by Sumitomo Bakelite Co., Ltd.), 50 parts by mass of wood powder, 50 parts by mass (50.0 g) of each of the modified lignin 1 to 12 obtained in Examples 1 to 12, 20 parts by mass of hexamethylenetetramine as a curing agent, and 1 part of zinc stearate as an internal release agent were mixed and kneaded with a two-roll kneader at 100 to 110° C. for 3 minutes, so as to provide a modified lignin-containing resin composition material.

The resulting modified lignin-containing resin composition material was pressed into a cavity of a heated mold, molded by a transfer molding method under molding conditions of 170° C. and 5 minutes, and cured in an oven at 180° C. for 8 hours, so as to provide a molded article.

The evaluation results of the resin composition materials and the molded articles are shown in Table 2.

Comparative Example 1

The same procedure as in Example 13 was performed except that the raw material lignin 1 was used instead of the modified lignin, so as to provide a resin composition material and a molded article.

The evaluation results of the resin composition materials and the molded articles are shown in Table 2 (Table 2-1 or 2-2).

TABLE 2-1

| | Example | | | | | |
|---|---|---|---|---|---|---|
| Lignin | 13 modified lignin 1 | 14 modified lignin 2 | 15 modified lignin 3 | 16 modified lignin 4 | 17 modified lignin 5 | 18 modified lignin 6 |
| Kneading capability | A | A | A | A | A | A |
| Flexural strength | A | A | A | A | A | A |

TABLE 2-2

| | Example | | | | | | Comparative Example |
|---|---|---|---|---|---|---|---|
| Lignin | 19 modified lignin 7 | 20 modified lignin 8 | 21 modified lignin 9 | 22 modified lignin 10 | 23 modified lignin 11 | 24 modified lignin 12 | 1 raw material lignin 1 |
| Kneading capability | A | A | A | A | A | A | A |
| Flexural strength | A | A | A | A | A | A | B |

Examples 25 to 36

In a 0.5 L separable flask equipped with a reflux condenser and agitation blades, 50 parts by mass (50.0 g) of each of the modified lignin 1 to 12 obtained in Examples 1 to 12, and 30 parts by mass of a 40% by mass formaldehyde aqueous solution were added and agitated. The molar ratio of formaldehyde and phenol in the modified lignin was 1.5. While 35 parts by mass of a 50% by mass sodium carbonate aqueous solution was gradually added dropwise thereto, the mixture was heated to 100° C. for 2 hours to provide a liquid composition.

54 parts by mass of wood powder was further added thereto, and the mixture was agitated until uniform, so as to provide a modified lignin-containing resin composition material.

The resulting modified lignin-containing resin composition material was depressurized to remove water, and press molded at a surface pressure of 0.2 MPa, 180° C., and 10 minutes, followed by curing in an oven at 200° C. for 4 hours, so as to provide a molded article.

The evaluation results of the resin composition materials and the molded articles are shown in Table 3.

Comparative Example 2

The same procedure as in Example 25 was performed except that the raw material lignin 1 was used instead of the modified lignin, so as to provide a molded article.

The evaluation results of the resin composition material and the molded article are shown in Table 3 (Table 3-1 or 3-2).

TABLE 3-1

| | Example | | | | | |
|---|---|---|---|---|---|---|
| Lignin | 25 modified lignin 1 | 26 modified lignin 2 | 27 modified lignin 3 | 28 modified lignin 4 | 29 modified lignin 5 | 30 modified lignin 6 |
| Agitation capability | A | A | A | A | A | A |
| Flexural strength | A | A | A | A | A | A |

TABLE 3-2

| | Example | | | | | | Comparative Example |
|---|---|---|---|---|---|---|---|
| Lignin | 31 modified lignin 7 | 32 modified lignin 8 | 33 modified lignin 9 | 34 modified lignin 10 | 35 modified lignin 11 | 36 modified lignin 12 | 2 raw material lignin 1 |
| Agitation capability | A | A | A | A | A | A | A |
| Flexural strength | A | A | A | A | A | A | B |

It is understood from Tables 2 and 3 that the modified lignin 1 to 12 is improved in mixing capability since the excellent kneading capability and the excellent agitation capability in reaction are obtained as compared to the raw material lignin 1. It is also understood as for the flexural property that the molded article using the modified lignin is better than that using the raw material lignin 1.

<Raw Material Lignin 2>

As a raw material lignin 2, kraft lignin (Lignin, alkali (product number: 370959), produced by Sigma-Aldrich Co. LLC) was used.

<Modified Lignin>

Example 37

The same procedure as in Example 5 was performed except that 40 parts by mass of the raw material lignin 2, 160 parts by mass of phenol, and 0.4 part by mass of sulfuric acid as the acid catalyst were used, and the reaction time was 2 hours, so as to provide a modified lignin 13 (4.3 g).

Example 38

The same procedure as in Example 37 was performed except that the acid catalyst was not used, and the reaction temperature was 300° C., so as to provide a modified lignin 14 (4.5 g).

The properties of the modified lignin 13 and 14 obtained in Examples 37 and 38 and the raw material lignin 2 are shown in Table 4.

TABLE 4

|  |  | Raw material lignin 2 | Example 37 | Example 38 |
|---|---|---|---|---|
| Molecular weight | Number average (Mn) | 1077 | 840 | 546 |
|  | Weight average (Mw) | 2279 | 1845 | 975 |
|  | Distribution (Mw/Mn) | 2.12 | 2.20 | 1.79 |
| Relative existence ratio (%) | H-type skeleton | 14.6 | 10.4 | 8.4 |
|  | G-type skeleton | 66.7 | 78.9 | 84.7 |
|  | S-type skeleton | 18.7 | 10.6 | 6.9 |
| Ratio of existence ratio and reactive site | ((2H + G)/S) | 5.1 | 9.4 | 14.7 |
|  | (2H + G) | 95.9 | 99.8 | 101.5 |
|  | Increment ratio before and after modification (%) | — | 4.1 | 5.8 |
| Hydroxy group ratio (%) | Aliphatic | 29.8 | 10.4 | 4.6 |
|  | Aromatic | 70.2 | 89.6 | 95.4 |
| Softening point (° C.) |  | >200° C. | 170 | 110 |
| No. of modified lignin |  | — | 13 | 14 |

<Cured Product>

In the following example and comparative example, resin composition materials and molded articles using the same were produced by using the modified lignin 13 obtained in Example 37 and the raw material lignin 2, and evaluated for the kneading capability, the agitation capability, and the flexural strength by the aforementioned manners.

Example 39

The same procedure as in Example 13 was performed except that the modified lignin 13 was used, so as to provide a resin composition material and a molded article.

The evaluation results of the resin composition material and the molded article are shown in Table 5.

Comparative Example 3

The same procedure as in Example 13 was performed except that the raw material lignin 2 was used instead of the modified lignin, so as to provide a resin composition material and a molded article.

The evaluation results of the resin composition material and the molded article are shown in Table 5.

TABLE 5

|  | Example 39 | Comparative Example 3 |
|---|---|---|
| Lignin | modified lignin 13 | raw material lignin 2 |
| Kneading capability | A | B |
| Flexural strength | A | — |

Example 40

The same procedure as in Example 25 was performed except that the modified lignin 13 was used, so as to provide a resin composition material and a molded article.

The evaluation results of the resin composition material and the molded article are shown in Table 6.

Comparative Example 4

The same procedure as in Example 25 was performed except that the raw material lignin 2 was used instead of the modified lignin, so as to provide a resin composition material and a molded article.

The evaluation results of the resin composition material and the molded article are shown in Table 6.

TABLE 6

|  | Example 40 | Comparative Example 4 |
|---|---|---|
| Lignin | modified lignin 13 | raw material lignin 2 |
| Agitation capability | A | B |
| Flexural strength | A | B |

It is understood from Tables 5 and 6 that the modified lignin 13 is improved in mixing capability since the excellent kneading capability and the excellent agitation capability in reaction are obtained as compared to the raw material lignin 2. It is also understood as for the flexural property that the molded article using the modified lignin is better than that using the raw material lignin 2.

INDUSTRIAL APPLICABILITY

The modified lignin of the present invention has a decreased molecular weight to enhance the mixing capability with another plastic material, and the reactive sites are increased. The enhancement of the properties of the molded article is expected due to the enhancement of the mixing capability and the increase of the reactive sites, and furthermore the easiness in mixing can omit the necessity of a costly extensive equipment in the production of a cured member. Moreover, lignin, most of which has been discarded, can be beneficially used, which is effective for the environmental preservation.

The invention claimed is:

1. A modified lignin having
a ratio ((2H+G)/S) of a total of twice of a relative existence ratio H (%) of an H-type skeleton and a relative existence ratio G (%) of a G-type skeleton with respect to a relative existence ratio S (%) of an S-type skeleton, obtained from integrated values measured by 31P-NMR, of 2.5 or more, and
an existence ratio of an aliphatic hydroxy group with respect to a total of existence ratios of the aliphatic hydroxy group and an aromatic hydroxy group, obtained from integrated values measured by 31P-NMR, of less than 10%,
and
wherein:
the modified lignin has a softening point of greater than or equal to 160° C. and less than or equal to 200° C. in the case where the number average molecular weight of the modified lignin is greater than or equal to 900 and less than or equal to 1,200 and the weight average molecular weight thereof is 2,400 or more and 3,000 or less;
the modified lignin has a softening point of greater than or equal to 130° C. and less than or equal to 190° C. in the case where the number average molecular weight of the modified lignin is greater than or equal to 600 and less than 900 and the weight average molecular weight thereof is 1,100 or more and 2,400 or less;
the modified lignin has a softening point of greater than or equal to 110° C. and less than or equal to 170° C. in the case where the number average molecular weight of the modified lignin is greater than or equal to 500 and less than 600 and the weight average molecular weight thereof is 900 or more and 1,100 or less;
the modified lignin has a softening point of greater than or equal to 90° C. and less than or equal to 170° C. in the case where the number average molecular weight of the modified lignin is greater than or equal to 300 and less than 500 and the weight average molecular weight thereof is 600 or more and 900 or less.

2. The modified lignin according to claim 1, wherein the modified lignin has a relative existence ratio ((2H+G)/S) of 2.8 or more.

3. A modified lignin-containing material comprising the modified lignin according to claim 1.

4. A modified lignin-containing resin composition material comprising the modified lignin according to claim 1.

5. The modified lignin-containing resin composition material according to claim 4, the modified lignin-containing resin composition material further comprises one or more kind of a thermosetting resin and an aldehyde compound.

6. A molded article comprising one or more of the modified lignin-containing resin composition materials according to claim 4.

* * * * *